United States Patent
Fujimura et al.

(10) Patent No.: US 12,309,285 B2
(45) Date of Patent: May 20, 2025

(54) IDENTIFIER CHANGE MANAGEMENT APPARATUS, IDENTIFIER CHANGE MANAGEMENT METHOD, AND IDENTIFIER CHANGE MANAGEMENT PROGRAM

(71) Applicant: NIPPON TELEGRAPH AND TELEPHONE CORPORATION, Tokyo (JP)

(72) Inventors: Shigeru Fujimura, Musashino (JP); Shigenori Ohashi, Musashino (JP); Atsushi Nakadaira, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 244 days.

(21) Appl. No.: 18/029,315

(22) PCT Filed: Oct. 7, 2020

(86) PCT No.: PCT/JP2020/038039
§ 371 (c)(1),
(2) Date: Mar. 29, 2023

(87) PCT Pub. No.: WO2022/074773
PCT Pub. Date: Apr. 14, 2022

(65) Prior Publication Data
US 2023/0370280 A1    Nov. 16, 2023

(51) Int. Cl.
*H04L 9/32* (2006.01)
*H04L 9/14* (2006.01)
*H04L 9/30* (2006.01)

(52) U.S. Cl.
CPC .............. *H04L 9/3247* (2013.01); *H04L 9/14* (2013.01); *H04L 9/3073* (2013.01)

(58) Field of Classification Search
CPC ....... H04L 9/0891; H04L 9/14; H04L 9/3073; H04L 9/3247; H04L 9/50
See application file for complete search history.

(56) References Cited

U.S. PATENT DOCUMENTS

2017/0005804 A1*  1/2017  Zinder ................. H04L 9/3247
2019/0230073 A1*  7/2019  Patel ................... G06F 16/9014
(Continued)

FOREIGN PATENT DOCUMENTS

| CN | 109118363 B | * | 2/2021 | ......... G06Q 20/3829 |
| JP | 2018530175 A | * | 10/2018 | |
| JP | 6628188 B2 | | 1/2020 | |

OTHER PUBLICATIONS

X. Yang, C. Chen, T. Ma, Y. Li and C. Wang, "An Improved Certificateless Aggregate Signature Scheme for Vehicular Ad-Hoc Networks," 2018 IEEE 3rd Advanced Information Technology, Electronic and Automation Control Conference (IAEAC), Chongqing, China, 2018, pp. 2334-2338. (Year: 2018).*

(Continued)

*Primary Examiner* — Michael Simitoski
(74) *Attorney, Agent, or Firm* — Harness, Dickey & Pierce, P.L.C.

(57) ABSTRACT

An identifier change management apparatus according to one embodiment includes: a key management unit configured to manage a group of private keys including a first private key; a message input unit configured to receive a message; a transaction issuing unit configured to issue an identifier change transaction including a hash value of the message and a first signature value generated from the first private key; a distributed ledger in which an identifier change program is registered, the identifier change program holding a pairing public key used when the identifier is changed and a second signature value; and a program control management unit configured to calculate a pairing (Continued)

signature value by the first and second signature values by the identifier change program and change the identifier on condition that the pairing signature value, the pairing public key, and the hash value satisfy an equation using a predetermined pairing function.

8 Claims, 6 Drawing Sheets

(56) References Cited

U.S. PATENT DOCUMENTS

| | | | |
|---|---|---|---|
| 2020/0076798 A1* | 3/2020 | Lidsky | H04L 9/3228 |
| 2020/0228349 A1 | 7/2020 | Basu et al. | |
| 2020/0342136 A1* | 10/2020 | Murdoch | H04L 9/3239 |
| 2020/0403795 A1* | 12/2020 | Murdoch | G06Q 20/4014 |
| 2022/0051230 A1* | 2/2022 | Zhuang | G06Q 20/065 |

OTHER PUBLICATIONS

Nasdaq, Inc. JP-2018530175-A (machine translation). Published Oct. 11, 2018. (Year: 2018).*
Ohashi Shigenori et al. WO 2020050390 A1 (machine translation). Published Mar. 12, 2020. (Year: 2020).*

* cited by examiner

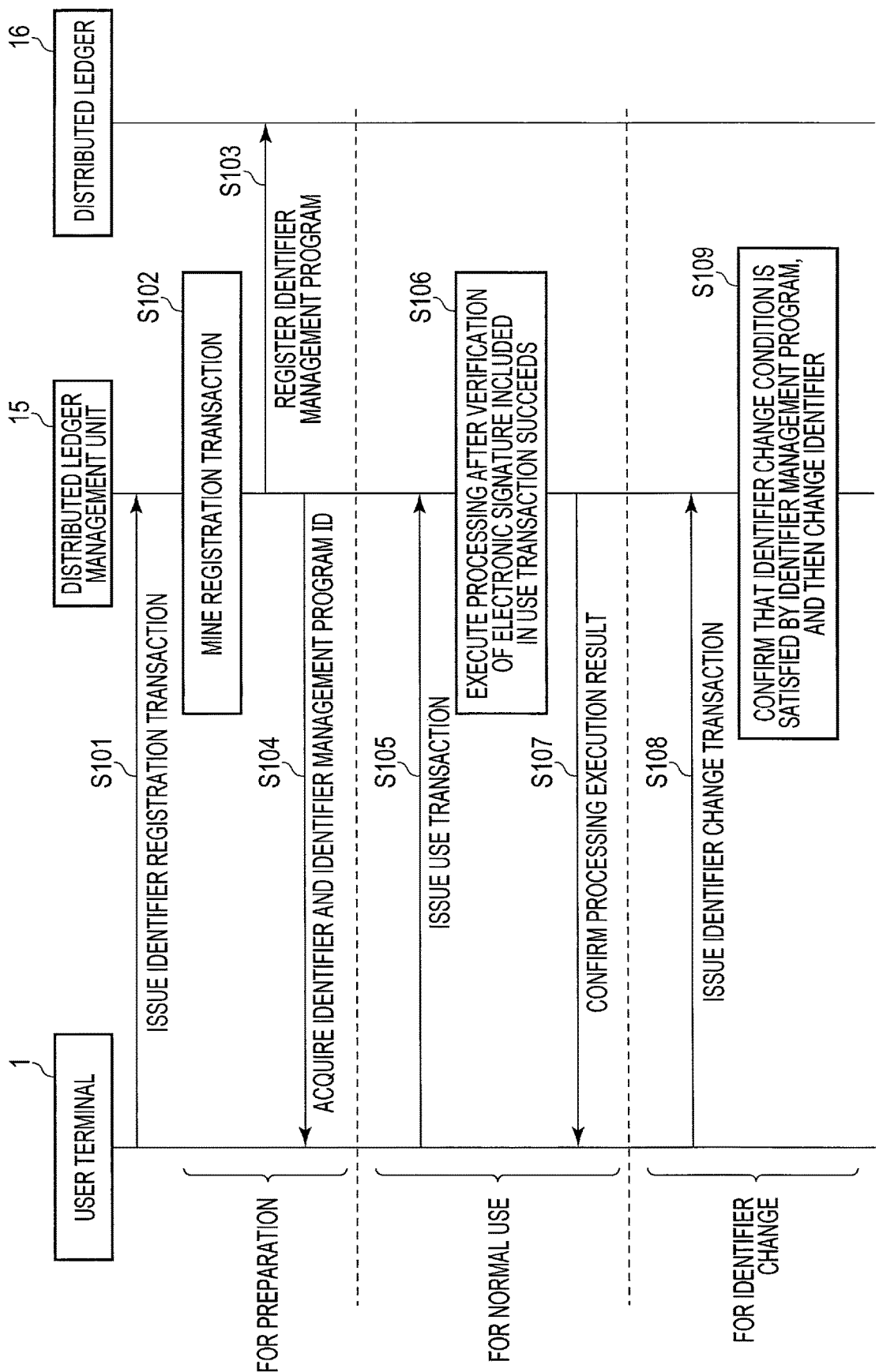

Fig. 5

- ID OF IDENTIFIER MANAGEMENT PROGRAM ON DISTRIBUTED LEDGER
- FUNCTION INFORMATION SPECIFYING FUNCTION TO BE EXECUTED BY IDENTIFIER MANAGEMENT PROGRAM
- CRYPTOGRAPHIC HASH VALUE $H(a)$ OF MESSAGE $a$
- SIGNATURE VALUE $\sigma_2 = s_2 H(a)$
- PUBLIC KEY $P' = P_3' + P_c'$ FOR SETTING NEXT IDENTIFIER CHANGE CONDITION
- SIGNATURE VALUE $\sigma_c' = s_c' H(a')$ FOR SETTING NEXT IDENTIFIER CHANGE CONDITION $\}\ m$

- SIGNATURE VALUE $\sigma_m$ OBTAINED BY SIGNING HASH VALUE $H(m)$ WITH PRIVATE KEY $s_2$ FOR IDENTIFIER CHANGE
- PUBLIC KEY $P_2$

IDENTIFIER CHANGE MANAGEMENT APPARATUS, IDENTIFIER CHANGE MANAGEMENT METHOD, AND IDENTIFIER CHANGE MANAGEMENT PROGRAM

CROSS-REFERENCE TO RELATED APPLICATIONS

This application is a 371 U.S. National Phase of International Application No. PCT/JP2020/038039, filed on Oct. 7, 2020. The entire disclosure of the above application is incorporated herein by reference.

TECHNICAL FIELD

The present invention relates to an identifier change management apparatus, an identifier change management method, and an identifier change management program.

BACKGROUND ART

In transactions of crypto assets represented by bitcoin (registered trademark), blockchains are used as a type of decentralized distributed ledger technology. In the distributed ledger technology, each user terminal participating in the network holds the same distributed ledger.

There is a method that requires cooperation from a trusted third party when an identifier (address) on a distributed ledger is changed. An example of such a method that use a trusted third party takes the form of requiring two of three signatures registered in advance as a condition for changing an identifier, in which two of the keys for the signatures are managed by a user terminal, and the remaining one is managed by the trusted third party. In this way, even in a case where one of the keys managed by the user terminal has been leaked or lost, it is possible to satisfy the condition for changing the identifier by obtaining cooperation from the trusted third party, register a new signature to be used, and change the condition for changing the identifier next time. Such a form of management can be achieved by a method called multi-signature (see, for example, Patent Literature 1).

CITATION LIST

Patent Literature

Patent Literature 1: Japanese Patent No. 6628188

SUMMARY OF INVENTION

Technical Problem

In a case where two keys have been leaked or lost from a user terminal due to a breach by a trusted third party or negligence, the user terminal cannot change the identifier. In addition, distributed ledgers have the greatest feature of distribution of authority. Thus, setting a trusted third party within a distributed ledger system results in existence of a person having privileges in some functional capabilities, which results in a loss of the greatest feature of distributed ledgers.

The present invention has been made in view of the above circumstances, and it is an object of the present invention to provide an identifier change management apparatus, an identifier change management method, and an identifier change management program that allow for changing an identifier without the need for a trusted third party.

Solution to Problem

In order to achieve the object described above, the present invention provides an identifier change management apparatus connectable to a distributed ledger network, the identifier change management apparatus including: a key management unit configured to manage a group of private keys including a first private key used when an identifier is changed; a message input unit configured to receive a message to be used when the identifier is changed; a transaction issuing unit configured to issue an identifier change transaction including a hash value of the message and a first signature value generated from the first private key; a distributed ledger in which an identifier change program is registered, the identifier change program holding a pairing public key used when the identifier is changed and a second signature value generated from a second private key randomly generated; a distributed ledger management unit configured to manage the distributed ledger; and a program control management unit configured to calculate a pairing signature value by the first signature value and the second signature value by the identifier change program when the distributed ledger management unit receives the identifier change transaction, and change the identifier on condition that the pairing signature value, the pairing public key, and the hash value satisfy an equation using a predetermined pairing function.

Advantageous Effects of Invention

One aspect of the present invention provides an identifier change management apparatus, an identifier change management method, and an identifier change management program that allow for changing an identifier without the need for a trusted third party.

BRIEF DESCRIPTION OF DRAWINGS

FIG. 4 is a diagram illustrating an overall processing flow in the user terminal.

FIG. 5 is a diagram illustrating a data structure of an identifier change transaction.

DESCRIPTION OF EMBODIMENTS

Figure 1:
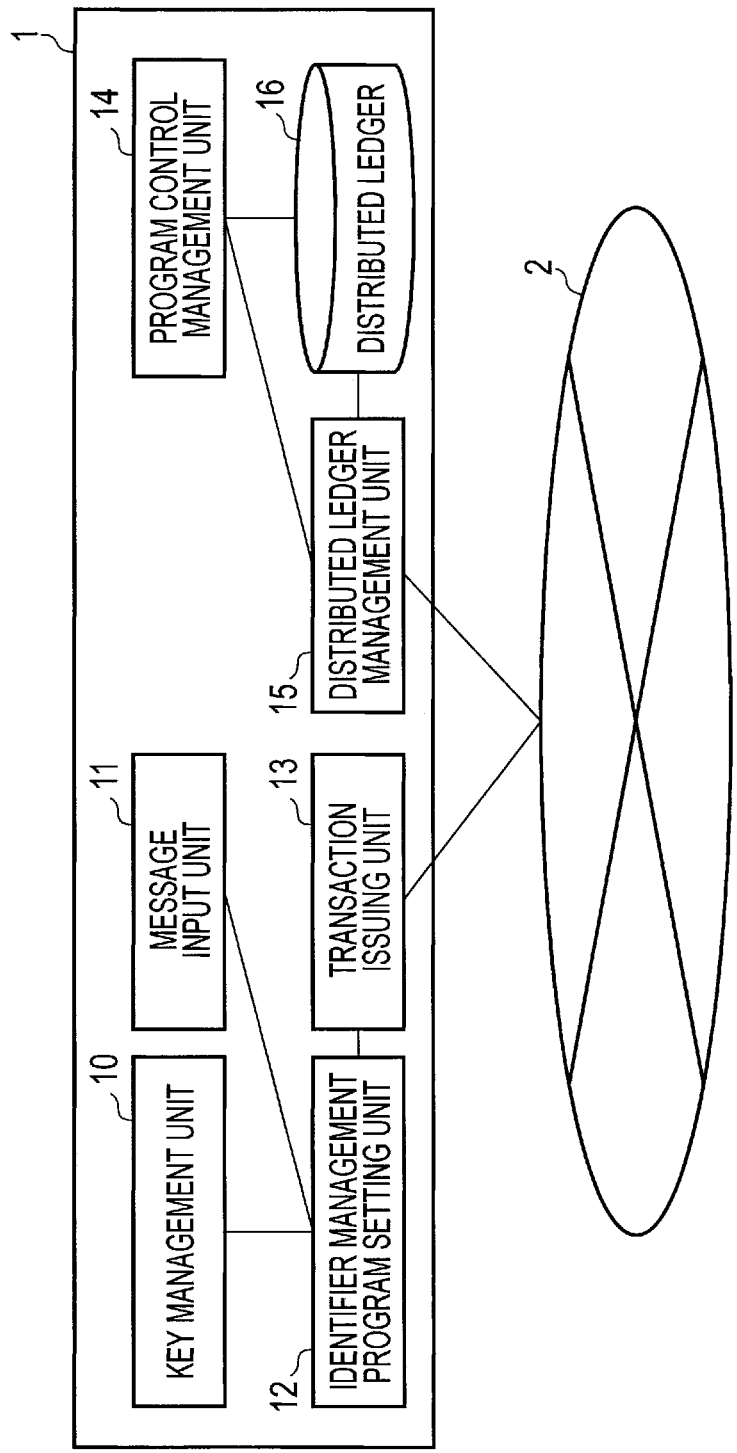
FIG. 1 is a diagram illustrating an overall configuration of a distributed ledger system including a user terminal that operates as an identifier change management apparatus according to an embodiment and a distributed ledger network.

Hereinafter, an embodiment according to the present invention will be described with reference to the drawings.
[Configuration]
FIG. 1 is a diagram illustrating an overall configuration of a distributed ledger system including a user terminal 1 that operates as an identifier change management apparatus according to the present embodiment and a distributed ledger network 2. The distributed ledger system illustrated in FIG. 1 includes the user terminal 1 and the distributed ledger network 2.

The user terminal 1 is connected to the distributed ledger network 2, which is a peer-to-peer (P2P) network, in an autonomously distributed manner. In addition to the user terminal 1 illustrated in FIG. 1, a plurality of user terminals is connected to the distributed ledger network 2. For example, a plurality of the user terminals 1 may be connected.

The user terminal 1 includes a key management unit 10, a message input unit 11, an identifier management program setting unit 12, a transaction issuing unit 13, a program control management unit 14, a distributed ledger management unit 15, and a distributed ledger 16. The user terminal 1 is, for example, a node that uses the distributed ledger network 2. The node has a functional capability of performing transaction verification processing and updating and holding ledger information.

The key management unit 10 manages a private key for issuing a transaction. The private key for issuing a transaction is also a private key for using various functions on the distributed ledger 16. The various functional capabilities may be any functional capabilities as long as the functional capabilities are information stored in the distributed ledger 16 and ownership can be transmitted and received between the user terminals 1. For example, the various functional capabilities may be functional capabilities such as a crypto-asset transaction. The key management unit 10 further holds a group of private keys. The group of private keys will be described later.

The message input unit 11 receives a message a from a user of the user terminal 1. The message a may be any message such as a password. This password may be a fixed password, or may be a disposable password that can be used only once. In addition, the password is managed in a storage location other than the user terminal 1, such as paper or a dedicated device. That is, the password may be held by a general method that allows the password to be securely held by the user terminal 1. For example, the password is managed as a QR code (registered trademark) printed on paper outside the user terminal 1. In addition, the private key managed externally may be prepared either for use of one time, or for use of a plurality of times.

The identifier management program setting unit 12 sets various conditions in an identifier management program registered or to be registered in the distributed ledger 16. In the identifier management program, a condition for confirming that a transaction has been validly issued from the user terminal 1 during normal use has been set by the identifier management program setting unit 12. The condition in the present embodiment is successful verification of electronic signatures included in various transactions issued from the user terminal 1. Thus, the identifier management program holds a public key $P_1$, which is held by the key management unit 10 and paired with a private key $s_1$ to be used during normal use. Here, s represents a private key, and P represents a public key. In addition, the identifier management program calculates an available identifier from a public key $P_{n-1}$. The available identifier corresponds to a so-called address or account used by the user terminal 1. Note that the available identifier is acquired from the public key by a general calculation method, and a detailed description thereof will be omitted here.

Furthermore, in the identifier management program, an identifier change condition for changing an identifier has been set by the identifier management program setting unit 12. The setting of the identifier change condition for changing an identifier will be described later.

The transaction issuing unit 13 uses a private key managed by the key management unit 10 to issue a transaction to the distributed ledger network 2. For example, the transaction issuing unit 13 issues a transaction including a crypto-asset transaction or the like. In the present embodiment, the transaction issuing unit 13 also issues a transaction for registering an identifier management program set by the identifier management program setting unit 12 on the distributed ledger 16 and a transaction for changing an identifier on the distributed ledger 16. Note that the transaction for changing an identifier on the distributed ledger 16 will be described later.

The program control management unit 14 controls and manages programs such as an identifier management program stored in the distributed ledger 16. In the program control management unit 14 according to the present embodiment, the identifier management program is rewritten in response to an identifier change request from the user terminal 1. Thus, the program control management unit 14 controls this rewriting to manage the identifier management program.

The distributed ledger management unit 15 maintains the distributed ledger network 2 in cooperation with other user terminals connected to the distributed ledger network 2 in an autonomously distributed manner. The distributed ledger management unit 15 causes the program control management unit 14 to confirm whether a transaction issued with the use of the identifier management program stored in the distributed ledger 16 has been validly issued from the user terminal 1. For example, the program control management unit 14 uses the public key $P_1$ to verify a signature value $\sigma_1$ of an electronic signature added to a transaction. Here, $\sigma$ represents a signature value. Then, in a case where the signature has been successfully verified, the program control management unit 14 determines that the transaction has been validly issued from the user terminal 1. Note that signature verification may be performed by a general method with the use of the public key $P_1$, and detailed description thereof will be omitted here.

In addition, when receiving a transaction issued to the distributed ledger network 2, the distributed ledger management unit 15 causes the program control management unit 14 to execute a program for performing a procedure of verifying and approving the received transaction. For example, in a case where a blockchain is used, the program control management unit 14 generates one block constituted by transactions issued on the distributed ledger network 2 during a predetermined period of time, and mines the block. The program control management unit 14 adds a block that has been successfully verified to a blockchain stored in the distributed ledger 16. Note that the technology for maintaining the distributed ledger network 2 is not limited to the blockchain, and may be any technology for maintaining the distributed ledger network 2, such as a directed acyclic graph (DAG). Furthermore, as a method of approving a new block, a method other than mining may be used, for example, a distributed consensus algorithm may be used.

The distributed ledger 16 is synchronized with the distributed ledgers 16 of all the user terminals 1 connected to the distributed ledger network 2 via the distributed ledger management unit 15, thereby storing successfully verified transactions. For example, in a case where a blockchain is used, the distributed ledger 16 stores the blockchain and a data set managed by the blockchain.

The distributed ledger network 2 is a network using a decentralized distributed ledger technology, which requires no specific administrator. The distributed ledger network 2 may be any of an open type, a private type, and a consortium type. However, the distributed ledger network 2 is a network that can be managed by the distributed ledger 16 and does not include processing registered a posteriori by a specific administrator in the process of transaction verification, execution, and registration in the distributed ledger 16.

Figure 2:
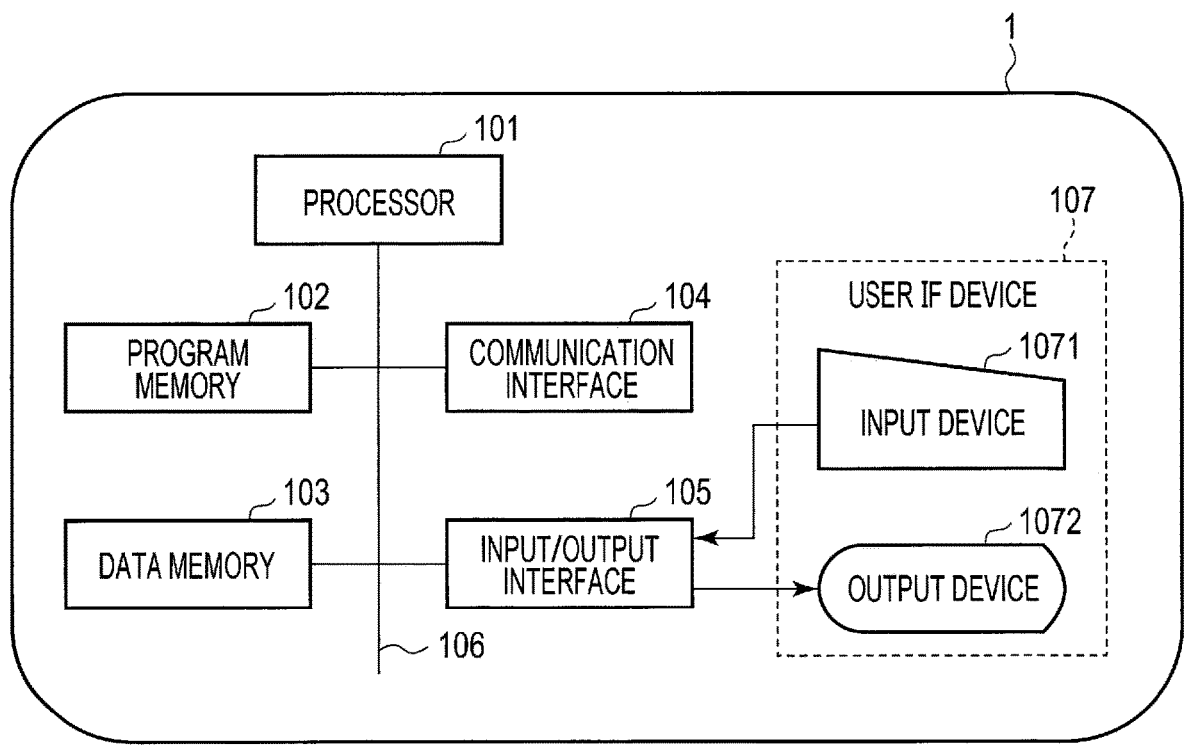
FIG. 2 is a block diagram illustrating an example of a hardware configuration of the user terminal.

FIG. 2 is a block diagram illustrating an example of a hardware configuration of the user terminal 1.

The user terminal 1 includes, for example, a hardware processor 101 such as a central processing unit (CPU) or a micro processing unit (MPU). In addition, a program memory 102, a data memory 103, a communication interface 104, and an input/output interface 105 are connected to the processor 101 via a bus 106.

The program memory 102 can use, as a storage medium, a combination of a nonvolatile memory to and from which writing and reading can be performed at any time, such as an erasable programmable read only memory (EPROM) or a memory card, and a nonvolatile memory such as a read only memory (ROM), for example. The program memory 102 stores a program necessary for the processor 101 to execute various types of control processing according to one embodiment. That is, any processing functional capability unit in each unit of the functional configuration described above can be implemented by the above-described processor 101 reading and executing a program stored in the program memory 102.

The data memory 103 is a storage using, as a storage medium, a combination of a nonvolatile memory to and from which writing and reading can be performed at any time, such as a memory card, and a volatile memory such as a random access memory (RAM), for example. The data memory 103 is used to store data acquired and created in the process in which the processor 101 executes a program to perform various types of processing. That is, in the data memory 103, an area for storing various types of data is appropriately secured in the process of performing the various types of processing. The distributed ledger 16 is constituted by the program memory 102 and the data memory 103. That is, a program such as an identifier management program stored on the distributed ledger 16 is stored in the program memory 102, and data such as a blockchain is stored in the data memory 103.

The communication interface 104 includes one or more wireless communication modules. For example, the communication interface 104 includes a wireless communication module using a short-range wireless technology such as Bluetooth (registered trademark). Furthermore, the communication interface 104 includes, for example, a wireless communication module wirelessly connected to a Wi-Fi access point or a mobile phone base station. Under the control of the processor 101, the wireless communication module is connected to the distributed ledger network 2 via a Wi-Fi access point or a mobile phone base station, and can communicate with other user terminals to transmit and receive various types of information. Note that the communication interface 104 may include one or more wired communication modules.

The input/output interface 105 is an interface with a user interface device 107. Note that, in FIG. 2, the "user interface device" is described as "USER IF DEVICE".

The user interface device 107 includes an input device 1071 and an output device 1072. The output device 1072 is a display device using, for example, liquid crystal, organic electro luminescence (EL), or the like, and displays an image according to a signal input from the input/output interface 105. The input device 1071 is an input detection sheet that is disposed on a display screen of the display device as the output device 1072 and employs an electrostatic method or a pressure method, and outputs a touch position of a user to the processor 101 via the input/output interface 105. Note that the input device 1071 and the output device 1072 may be configured by independent devices. The input/output interface 105 can input operation information regarding an input on the input device 1071 to the processor 101, and cause the output device 1072 to display display information generated by the processor 101.

[Operation]

Figure 3:
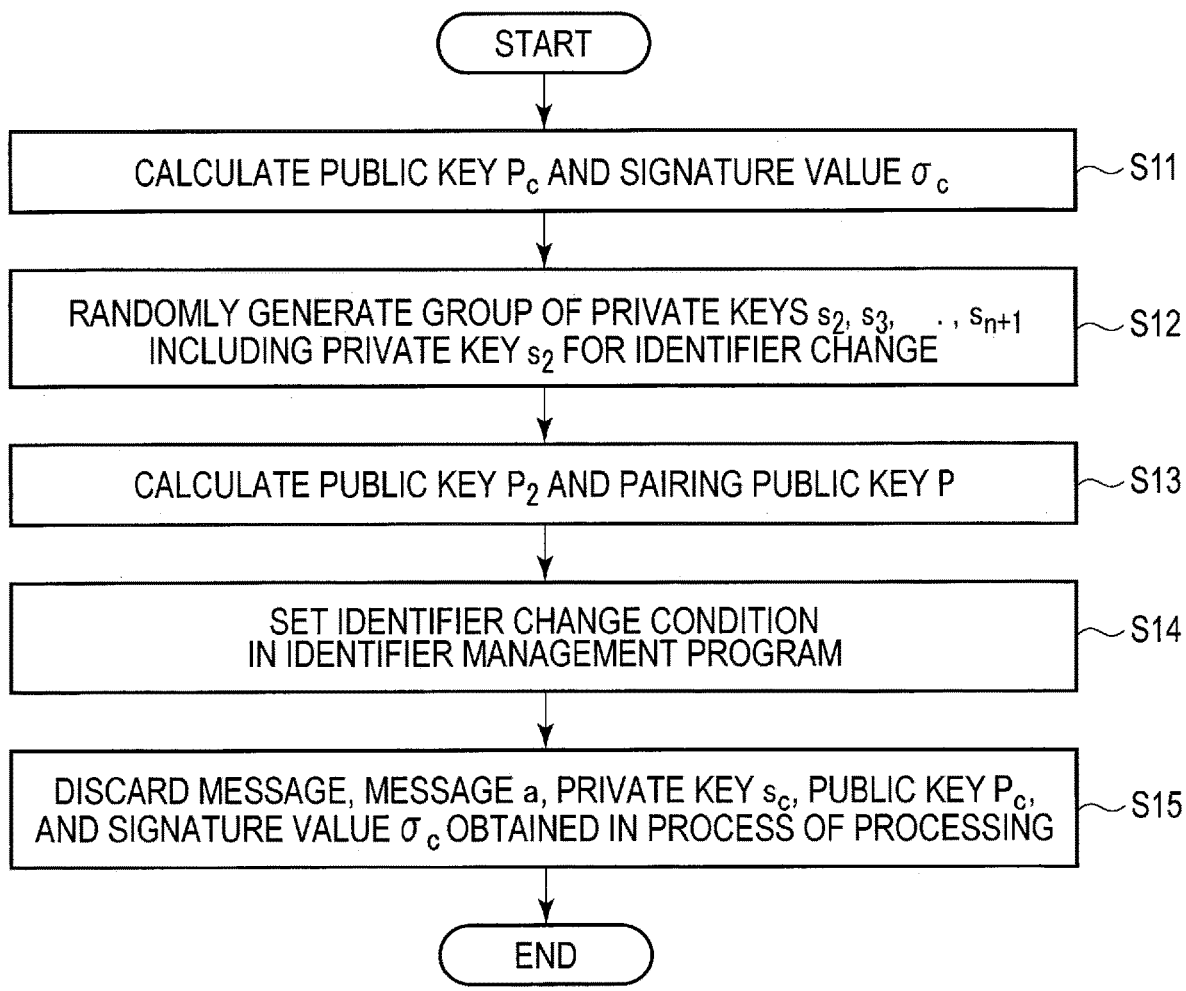
FIG. 3 is a flowchart for setting an identifier change condition of an identifier management program.

FIG. 3 is a flowchart for setting an identifier change condition of an identifier management program. The processor 101 of the user terminal 1 reads and executes a program stored in the program memory 102, thereby implementing the operation of this flowchart.

The identifier management program setting unit 12 calculates a public key $P_c$ and a signature value $\sigma_c$ (step S11). Here, c is a subscript representing a key for pairing described later. First, the identifier management program setting unit 12 acquires a message a corresponding to a password from a user of the user terminal 1 via the input device 1071. Then, the public key $P_c$ and the signature value $\sigma_c$ are calculated from the message a and a randomly generated private key $s_c$. For example, the public key $P_c$ can be calculated by $P_c = s_c Q$, and the signature value $\sigma_c$ can be calculated by $\sigma_c = s_c H(a)$. Here, H represents a cryptographic hash function, and Q is a public parameter for calculating a public key in a Boneh-Lynn-Shacham (BLS) signature. Thus, H(a) is a hash value obtained by applying the cryptographic hash function to the message a. Note that the hash function H and the public parameter Q are determined as follows. When G1 and G2 are additive cyclic groups of a prime order p, a mapping H: {character string of any length}->G1, and Q is a fixed point of G2. That is, Q is a public parameter that has any value in the additive cyclic group G2.

The identifier management program setting unit 12 randomly generates a group of private keys $s_2, s_3, \ldots, s_{n+1}$, including the private key $s_2$ for identifier change (step S12). Here, n is any positive integer. The identifier management program setting unit 12 registers the generated group of private keys in the key management unit 10. Generating the group of private keys reduces, to 1/n, a possibility that the private key $s_2$ for identifier change is identified in a case where the group of private keys has been leaked or spilled from the key management unit 10. Thus, increasing n reduces the possibility that the private key $s_2$ is identified.

The identifier management program setting unit 12 calculates a public key $P_2$ and a pairing public key P (step S13). The identifier management program setting unit 12 first calculates the public key $P_2$ paired with the private key $s_2$. $P_2$ is calculated from $P_2 = s_2 Q$. Thereafter, the identifier management program setting unit 12 performs public key pairing. The identifier management program setting unit 12 calculates the pairing public key P by $P = P_2 + P_c$.

The identifier management program setting unit 12 sets an identifier change condition in an identifier management program (step S14). Specifically, the identifier change condition set is when H(a) and $\sigma_2$ that satisfy an equation $e(H(a), P) = e(\sigma, Q)$ regarding a pairing function are input, where a pairing signature value $\sigma = \sigma_2 + \sigma_c$. In addition, the identifier management program holds the pairing public key P and the signature value $\sigma_c$.

The identifier management program setting unit 12 discards the message a, the private key $s_c$, the public key $P_c$, and the signature value $\sigma_c$ obtained in the process of the processing described above (step S15). The private key, the public key, and the signature value are discarded, so that there is no risk of leakage or loss of these. It is therefore possible to improve security regarding which public keys have been paired to obtain the public key P registered on the distributed ledger 16. On the other hand, the user obtains the signature value $\sigma_2$ by correctly selecting H(a) calculated from the message a and $s_2$ used for pairing, and thus can satisfy the identifier change condition set in the identifier management program.

FIG. 4 is a diagram illustrating an overall processing flow in the user terminal 1.

The distributed ledger management unit 15 (and the program control management unit 14) and the distributed ledger 16 illustrated in FIG. 4 indicate the distributed ledger management units 15 (and the program control management units 14) and the distributed ledgers 16 of all the user terminals 1 in the distributed ledger system. That is, the distributed ledger management unit 15 (and the program control management unit 14) and the distributed ledger 16 illustrated in FIG. 3 may be the distributed ledger management unit 15 (and the program control management unit 14) and the distributed ledger 16 of the user terminal 1 illustrated in FIG. 1, or may be the distributed ledger management unit 15 (and the program control management unit 14) and the distributed ledger 16 of another user terminal 1. The processor 101 of the user terminal 1 reads and executes each program stored in the program memory 102, thereby implementing the operation of this flowchart.

Here, steps S101 to S104 indicate steps for preparation for using the identifier management program in the present embodiment, steps S105 to S107 indicate steps for normal use using the identifier management program, and steps S108 and S109 indicate steps for changing an identifier stored in the distributed ledger 16.

In the preparation, the transaction issuing unit 13 of the user terminal 1 issues, on the distributed ledger network 2, an identifier registration transaction for registering the identifier management program in the distributed ledger 16 (step S101). In the identifier management program, a condition for confirming that a use transaction has been validly issued from the user terminal 1 during normal use, an identifier change condition, and the like have been set by the identifier management program setting unit 12.

The distributed ledger management unit 15 causes the program control management unit 14 to mine the registration transaction (step S102). For example, in a case where a blockchain is used, mining is executed on one block constituted by a plurality of transactions including the registration transaction received during a predetermined time interval.

The distributed ledger management unit 15 causes the program control management unit 14 to register the identifier management program in the distributed ledger 16 in accordance with the identifier registration transaction that has been successfully mined (step S103). When this identifier registration program is registered in the distributed ledger 16, the distributed ledger management unit 15 acquires an ID indicating a storage location of the identifier registration program.

The user terminal 1 acquires the ID of the identifier management program from the distributed ledger management unit 15 (step S104). The user terminal 1 may also acquire an identifier calculated with the use of the public key $P_1$ held by the identifier management program.

During normal use, the transaction issuing unit 13 of the user terminal 1 issues a use transaction including a request for using information stored in the distributed ledger 16 (step S105). The use transaction includes, for example, the ID of the identifier management program, an available identifier, an instruction on a crypto-asset transaction, and an electronic signature generated with the use of the private key $s_1$ managed by the key management unit 10. Note that the request for using the information stored in the distributed ledger 16 is not limited to a crypto-asset transaction, and may be any information that is stored in the distributed ledger 16 and allows for transmission and reception of the ownership between the user terminals 1.

The distributed ledger management unit 15 verifies the electronic signature included in the use transaction, and executes processing in accordance with the request included in the use transaction after the verification succeeds (step S106). That is, the distributed ledger management unit 15 passes the ID of the identifier management program included in the use transaction to the program control management unit 14, and the program control management unit 14 executes the identifier management program indicated by the ID. The program control management unit 14 verifies the use transaction by the identifier management program. For example, the program control management unit 14 calculates a value obtained by decrypting the signature value $\sigma_1$ of the electronic signature included in the use transaction with the public key $P_1$ held by the identifier management program, and compares the calculated value with a hash value calculated with the use of the use transaction and a hash function. In a case where these values are the same as a result of the comparison, the program control management unit 14 determines that the use transaction has been successfully verified as having been validly issued from the user terminal 1. That is, the electronic signature is proved to have been applied by the user terminal. In a case where the verification has been successful, the distributed ledger management unit 15 causes the program control management unit 14 to execute processing of an optional program in accordance with a use identifier and a request included in the use transaction. In a case where the program control management unit 14 determines that the use transaction is not a transaction validly issued from the user terminal 1, the distributed ledger management unit 15 discards the use transaction. In addition, the distributed ledger management unit 15 may report to the user terminal 1 that there is a possibility that fraudulent use has been attempted.

The distributed ledger management unit 15 transmits processing execution result confirmation information including an execution result to the user terminal 1 (step S107). Upon receiving the information, the user terminal 1 may display the execution result to a user via the output device 1072 of the user terminal 1.

At the time of identifier change, the user terminal 1 issues an identifier change transaction including an identifier change request on the distributed ledger network 2 (step S108). In a case where the private key $s_1$ has been leaked or lost from the user terminal 1 due to negligence or the like, another terminal can acquire the leaked or lost private key $s_1$. The other terminal that has acquired the leaked or lost private key Si can be disguised as the user terminal 1 and issue a transaction using the private key $s_1$. It is therefore necessary for the user terminal 1 to change the identifier registered on the distributed ledger 16. In this case, the transaction issuing unit 13 of the user terminal 1 issues an identifier change transaction including a request for changing the identifier to the distributed ledger network 2.

FIG. 5 is a diagram illustrating a data structure of an identifier change transaction.

As illustrated in FIG. 5, the identifier change transaction includes six elements: the identifier management program ID, function information specifying a function to be executed by the identifier management program, the hash value H(a) of the message a, the signature value $\sigma_2$, a public key P' for setting the next identifier change condition, and a signature value $\sigma_{c'}$. In addition, the identifier change transaction includes $\sigma_m$ obtained by electronically signing the hash value H(m) of a message m, in which these six elements constitute the message m, with the private key $s_2$ for identifier change, and the public key $P_2$ paired with the private key $s_2$.

Note that the elements illustrated in FIG. 5 are generated as follows. The identifier management program setting unit 12 of the user terminal 1 acquires the private key $s_2$ set for identifier change from a group of private keys held by the key management unit 10. Furthermore, $s_{2'}, s_{3'}, \ldots, s_{n'}$ are generated in a similar manner to the generation of $s_2, s_3, \ldots s_n$, and thus $s_{3'}$ used for setting the next identifier change condition is acquired. The identifier management program setting unit 12 calculates the public key $P_2$ by a formula $P_2 = s_2 Q$ based on the private key $s_2$, and similarly calculates the public key $P_{3'}$ by a formula $P_{3'} = s_{3'} Q$ based on the private key $s_{3'}$. Furthermore, the identifier management program setting unit 12 acquires, from the message input unit 11, the message a, which is a password, and a message a' corresponding to a password for the next identifier change from the user. Next, as described above, the identifier management program setting unit 12 acquires the hash value H(a) of the message a, and acquires the signature value $\sigma_2$ by a formula $\sigma_2 = s_2 H(a)$. Furthermore, the identifier management program setting unit 12 calculates a public key $P_{c'}$ and the signature value $\sigma_{c'}$ from a randomly generated private key $s_{c'}$. Furthermore, the identifier management program setting unit 12 calculates the public key P' for setting the next identifier change condition by a formula $P' = P_{3'} + P_{c'}$, and further calculates the signature value $\sigma_{c'}$ for setting the next identifier change condition by a formula $\sigma_{c'} = s_{c'} H(a')$.

The distributed ledger management unit 15 causes the program control management unit 14 to confirm that the identifier change condition is satisfied and change the identifier (step S109). That is, when receiving the identifier change transaction, the distributed ledger management unit 15 reads the identifier management program ID included in the identifier change transaction, and passes the identifier management program ID to the program control management unit 14. The program control management unit 14 reads and executes the identifier management program indicated by the ID, and confirms whether the identifier change condition is satisfied. As a result of the confirmation, in a case where the identifier change condition is satisfied, the program control management unit 14 changes the next identifier change condition in the identifier management program, and changes, from $P_1$ to $P_2$, the public key used to calculate a currently available identifier to be held in the identifier management program. In a case where the identifier change condition is not satisfied as a result of the confirmation, the program control management unit 14 determines that the identifier change transaction is not a transaction validly issued from the user terminal 1, and the distributed ledger management unit 15 discards the identifier change transaction. In addition, the distributed ledger management unit 15 may report to the user terminal 1 that an identifier change request has been fraudulently made.

Figure 6:
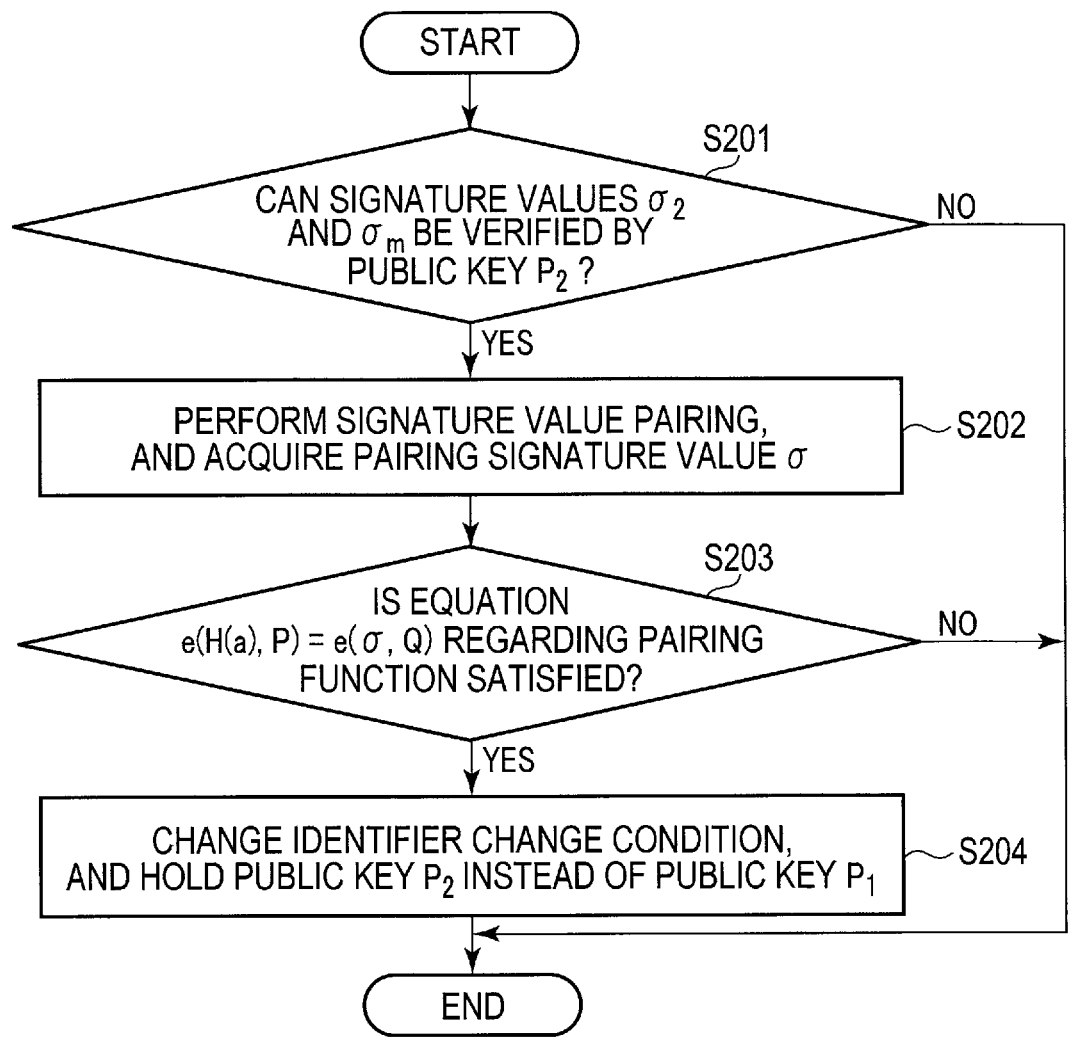
FIG. 6 is a flowchart illustrating step S109 in FIG. 4 in more detail.

FIG. 6 is a flowchart illustrating step S109 in FIG. 4 in more detail.

The program control management unit 14 determines whether the signature values $\sigma_2$ and $\sigma_m$ included in the identifier change transaction can be verified by the public key $P_2$ (step S201). In a case where the signature values $\sigma_2$ and $\sigma_m$ can be verified by the public key $P_2$, the identifier change transaction can be generated only by a terminal holding the private key $s_2$. Thus, in a case where it is determined that the signature values $\sigma_2$ and $\sigma_m$ can be verified by the public key $P_2$, the program control management unit 14 determines that the user has the private key $s_2$. The program control management unit 14 also determines that the range of the message m is data created by the user having the private key $s_2$. In a case where the program control management unit 14 determines that these values cannot be verified, the distributed ledger management unit 15 determines that the identifier change transaction is not a transaction validly issued from the user terminal 1, and discards the identifier change transaction.

In a case where the signature values $\sigma_2$ and $\sigma_m$ can be verified by the public key $P_2$, the program control management unit 14 performs signature value pairing, and acquires the pairing signature value $\sigma$ (step S202). The program control management unit 14 acquires the pairing signature value $\sigma$ by a formula $\sigma = \sigma_2 + \sigma_c$. The program control management unit 14 calculates the pairing signature value $\sigma$ from $\sigma_c$ held in the identifier management program and the signature value $\sigma_2$ included in the identifier change transaction.

The program control management unit 14 determines whether the equation $e(H(a), P) = e(\sigma, Q)$ regarding the pairing function is satisfied (step S203). The program control management unit 14 determines whether the above equation is satisfied based on the hash value H(a) included in the identifier change transaction, the pairing public key P held in the identifier management program, the pairing signature value $\sigma$ calculated in step S202, and a public parameter Q. In a case where the equation is satisfied, the processing proceeds to step S204. In a case where the program control management unit 14 determines that the equation is not satisfied, the distributed ledger management unit 15 determines that the identifier change transaction is not a transaction validly issued from the user terminal 1, and discards the identifier change transaction.

In a case where the equation $e(H(a), P) = e(\sigma, Q)$ is satisfied, the program control management unit 14 changes the identifier change condition in the identifier management program, and causes the identifier management program to hold the public key $P_2$ instead of the public key $P_1$ (step S204). That is, the identifier calculated using the public key $P_2$ is registered in the distributed ledger 16 as a currently available identifier. Furthermore, specifically, the identifier change condition is changed to when H(a') and $\sigma_{3'}$ that satisfy an equation $e(H(a'), P') = e(\sigma, Q)$ regarding the pairing function are input, where the pairing signature value $\sigma = \sigma_{3'} + \sigma_{c'}$. In addition, the identifier management program holds a pairing public key P' and the signature value $\sigma_{c'}$ as data related to the next identifier change condition. Note that the public key $P_c$ and the signature value $\sigma_c$ for changing the identifier are used only once for changing the identifier. This is for prevention of a retransmission attack. The identifier change transaction is recorded in the distributed ledger 16. Thus, the identifier change transaction is made widely public also to other user terminals. In a case where the public key P' and the signature value $\sigma_{c'}$ to be used from the next time on are not included in the identifier change transaction and the public key for identifier change is fixed, storing the public key that has been made widely public allows for a retransmission attack in which the same change request is retransmitted. In order to eliminate this risk, it is necessary to limit the use of the public key and the signature value for changing the identifier to once and always specify the next public key and signature value.

[Operation and Effect]

According to the above embodiment, the user terminal 1 can change the identifier without the need for a third party. This prevents a loss of authority distribution, which is the greatest feature of the distributed ledger 16, and also prevents key leakage on purpose or due to negligence by a third party.

Furthermore, the embodiment described above allows the user terminal 1 to implement a method of making it impossible for a third party to fraudulently use the identifier change functional capability in a case where only the key for identifier change has been leaked.

Other Embodiments

Note that the present invention is not limited to the above-described embodiment. For example, it has been described in the above embodiment that the user terminal 1 functions as a node. However, in a case where another user terminal functions as a node, the user terminal 1 is not required to function as a node. In this case, the user terminal 1 is not required to include the program control management unit 14, the distributed ledger management unit 15, and the distributed ledger 16.

Furthermore, the methods described in the above-described embodiment can be stored in a recording medium such as a magnetic disk (floppy (registered trademark) disk, hard disk, or the like), an optical disk (CD-ROM, DVD, MO, or the like), or a semiconductor memory (ROM, RAM, flash memory, or the like) as programs (software means) that can be executed by a computing machine (computer), or can also be distributed by being transmitted through a communication medium. Note that the programs stored on the medium side also include a setting program for configuring, in the computing machine, a software means (not only an execution program but also tables and data structures are included) to be executed by the computing machine. The computing machine that implements the present apparatus executes the above-described processing by reading the programs recorded in the recording medium, constructing the software means by the setting program as needed, and controlling the operation by the software means. Note that the recording medium described in the present specification is not limited to a recording medium for distribution, but includes a storage medium such as a magnetic disk or a semiconductor memory provided in the computing machine or in a apparatus connected via a network.

In short, the present invention is not limited to the above-described embodiment, and various modifications can be made in the implementation stage without departing from the gist thereof. In addition, the embodiments may be implemented in appropriate combination if possible, and in this case, combined effects can be obtained. Furthermore, the above-described embodiment includes inventions at various stages, and various inventions can be extracted by appropriate combinations of a plurality of disclosed components.

REFERENCE SIGNS LIST

1 User terminal
2 Distributed ledger network
10 Key management unit
11 Message input unit
12 Identifier management program setting unit
13 Transaction issuing unit
14 Program control management unit
15 Distributed ledger management unit
16 Distributed ledger
101 Processor
102 Program memory
103 Data memory
104 Communication interface
105 Input/output interface
106 Bus
107 User interface device
1071 Input device
1072 Output device

The invention claimed is:

1. An identifier change management apparatus connectable to a distributed ledger network, the identifier change management apparatus comprising:
    a distributed ledger in which an identifier change program is registered, the identifier change program holding a pairing public key used when the identifier is changed and a second signature value generated from a second private key randomly generated;
    a processor; and
    a storage medium having computer program instructions stored thereon, when executed by the processor, perform to:
    manage a group of private keys including a first private key used when an identifier is changed;
    receive a message to be used when the identifier is changed;
    issue an identifier change transaction including a hash value of the message and a first signature value generated from the first private key;
    manage the distributed ledger; and
    calculate a pairing signature value by using the first signature value and the second signature value by the identifier change program upon receiving the identifier change transaction, and change the identifier on condition that the pairing signature value, the pairing public key, and the hash value satisfy an equation using a predetermined pairing function.

2. The identifier change management apparatus according to claim 1, wherein
    the equation is $e(H(a), P)=e(\sigma, Q)$, where the pairing signature value is represented as $\sigma$, the hash value is represented as $H(a)$, the pairing public key is represented as P, and the pairing function is represented as $e(x, y)$, and Q is a public parameter for calculating a public key in a Boneh-Lynn-Shacham signature.

3. The identifier change management apparatus according to claim 2, wherein
    the pairing public key is calculated from a first public key calculated from the first private key and the public parameter, and a second public key calculated from the second private key and the public parameter.

4. The identifier change management apparatus according to claim 3, wherein
    the second private key and the second public key are discarded after generation of the pairing public key and the second signature value.

5. The identifier change management apparatus according to claim 1, wherein
the identifier change transaction further includes: an ID of the identifier change program for identifying the identifier change program from the distributed ledger; function information specifying a function to be executed by an identifier management program; a second pairing public key used for changing the identifier next time; a third signature value generated randomly and generated from a third private key different from the second private key; a fourth signature value; and the first public key paired with the first private key, and the fourth signature value is a signature value obtained by signing, with the first private key, a hash value of a message including the ID of the identifier change program, the function information, the hash value, the first signature value, the second pairing public key, and the third signature value.

6. The identifier change management apparatus according to claim 1, wherein
the group of private keys includes n randomly generated private keys, and n is any positive integer.

7. An identifier change management method executable by an identifier management apparatus connectable to a distributed ledger network, the identifier change management method comprising:
managing a group of private keys including a first private key used when an identifier is changed;
receiving a message to be used when the identifier is changed;
issuing an identifier change transaction including a hash value of the message and a first signature value generated from the first private key;
registering an identifier change program in a distributed ledger, the identifier change program holding a pairing public key used when the identifier is changed and a second signature value generated from a second private key randomly generated;
managing the distributed ledger; and
calculating, by the first signature value and the second signature value, a pairing signature value by the identifier change program when the identifier change transaction is received, and changing the identifier on condition that the pairing signature value, the pairing public key, and the hash value satisfy an equation using a predetermined pairing function.

8. A non-transitory computer readable storage medium storing a computer program which is executed by an identifier change management apparatus connectable to a distributed ledger network to provide the steps of:
managing a group of private keys including a first private key used when an identifier is changed;
receiving a message to be used when the identifier is changed;
issuing an identifier change transaction including a hash value of the message and a first signature value generated from the first private key;
registering an identifier change program in a distributed ledger, the identifier change program holding a pairing public key used when the identifier is changed and a second signature value generated from a second private key randomly generated;
managing the distributed ledger; and
calculating, by the first signature value and the second signature value, a pairing signature value by the identifier change program when the identifier change transaction is received, and changing the identifier on condition that the pairing signature value, the pairing public key, and the hash value satisfy an equation using a predetermined pairing function.

* * * * *